United States Patent [19]
Dougherty et al.

[11] Patent Number: 5,391,329
[45] Date of Patent: Feb. 21, 1995

[54] PROCESS FOR MAKING A SOLID OPTICAL LIMITER CONTAINING A GRADED DISTRIBUTION OF REVERSE SATURABLE MATERIAL

[75] Inventors: Thomas K. Dougherty, Playa Del Rey; William E. Elias, El Segundo; Alan R. Kost, Woodland Hills; Marvin B. Klein, Pacific Palisades, all of Calif.

[73] Assignee: Hughes Aircraft Company, Los Angeles, Calif.

[21] Appl. No.: 109,884

[22] Filed: Aug. 23, 1993

[51] Int. Cl.$^6$ .............................................. B29D 11/00
[52] U.S. Cl. ................................ 264/1.7; 156/228; 264/2.7; 264/325; 359/241; 359/885
[58] Field of Search ............... 264/1.7, 2.7, 320, 325, 264/1.9, 1.1, 216; 156/228, 245; 359/241, 885

[56] References Cited
U.S. PATENT DOCUMENTS

| | | | |
|---|---|---|---|
| 3,582,424 | 6/1971 | Norvaisa | 156/245 |
| 4,360,483 | 11/1982 | Ayres | 264/2.7 |
| 4,659,407 | 4/1987 | Lacotte et al. | 156/228 |
| 4,878,973 | 11/1989 | Ohtake et al. | 264/1.7 |
| 5,080,469 | 1/1992 | McCahon et al. | 359/241 |
| 5,172,278 | 12/1992 | Tutt et al. | 359/885 |

Primary Examiner—Mathieu D. Vargot
Attorney, Agent, or Firm—M. E. Lachman; M. W. Sales; W. K. Denson-Low

[57] ABSTRACT

An improved process is provided for making optical limiters having a graded axial distribution of a reverse saturable absorber compound, such as a buckminsterfullerene, in a host matrix, such as polymethyl methacrylate or polycarbonate. The process of the invention includes: (a) dissolving the reverse saturable absorber and the host matrix in a suitable solvent to form a solution having a preselected ratio of reverse saturable absorber to host matrix; (b) casting the solution onto a surface to form a film; (c) evaporating the solvent to form a free-standing film; (d) performing steps (a)–(c) for each different desired ratio of reverse saturable absorber to host matrix; (e) stacking the free-standing films in a desired order; and (f) hot-pressing the stack to form the optical limiter having a graded distribution of the reverse saturable absorber in the host matrix. If desired, the stack of films can be placed in a die for hot-pressing. The films can be pre-cut to the shape of the die.

15 Claims, 2 Drawing Sheets

PROCESS FOR MAKING A SOLID OPTICAL LIMITER CONTAINING A GRADED DISTRIBUTION OF REVERSE SATURABLE MATERIAL

This invention was made with United States Government support under Contract No. N62269-90-C-0239 awarded by the Department of the Navy. The United States Government has certain rights in this invention.

TECHNICAL FIELD

The present invention relates generally to light-absorbing materials called optical limiters, and, more particularly, to a process for making solid optical limiters.

BACKGROUND ART

Optically sensitive materials such as optical sensors and the human eye are used to detect light because they contain components which are sensitive to light energy. For example, an optoelectronic sensor, such as an "electric eye" or a focal plane array, produces a voltage when light falls upon a sensing material within the sensor. However, such sensors can be "blinded" by overexposure to high intensity light, just as the human eye becomes blinded if it is exposed to overly intense light. In each case, exposure to high intensity light can temporarily or even permanently destroy the ability of the optically sensitive material to react to light.

There are two approaches to protecting such optically sensitive materials against blinding by overexposure to high intensity light. In the first, or "active" approach, when the electronic circuitry of the optically sensitive device detects a harmfully high intensity of light, it operates a mechanism to interpose a physical barrier between the light source and the optically sensitive material. The second, or "passive" approach, is employed when the onset of the harmful high-intensity light is so fast that no active system has the time to respond. In a passive protection system, a barrier is formed directly in response to the incident light. One such system, or device, is called an "optical limiter" and is characterized by the behavior that as the intensity of incident light increases, the intensity of light transmitted through the system also increases up to a saturation level. Above the saturation level, the transmitted light intensity remains substantially constant even with increasing intensity of incident light.

Optical limiters are devices one class of which comprises materials which exhibit reverse saturable absorption, that is, materials which absorb more light as the incident intensity is increased. These devices must employ lenses to focus the light into the reverse saturable materials. The higher intensity of the focussed light is required to activate the optical limiter when the intensity of the incident light is weak and insufficient to activate the optical limiter but still sufficient to damage the eye or sensor.

U.S. Pat. No. 5,080,469, issued Jan. 14, 1992, and assigned to the same assignee as the present application, describes a process for making a solid phase optical limiter with a graded distribution of reverse saturable absorber molecules in the limiter. The disclosed process involves fusing a plurality of wafers together, each having a different molecular concentration of the reverse saturable absorber in a host polymer, such as polymethyl methacrylate (PMMA). The fusing is accomplished by applying a thin film of unpolymerized PMMA to each face of the wafer, stacking the wafers, and allowing the film to cure. In this manner, a gradient, or non-uniform concentration, in the reverse saturable absorber is obtained along the optic axis, which produces a self-protecting effect. The optic axis is that axis parallel to the incident light on the optical limiter.

While the teachings of this patent are certainly adequate, the fabrication process is not as convenient as one might desire, the process is expensive, and the process is not scalable to commercially viable production. Accordingly, an improved process for making optical limiters with graded distribution is required.

A new reverse saturable absorber comprises buckminsterfullerenes, such as $C_{60}$ or $C_{70}$, which may be formed as a thin film or incorporated in a host material, such as PMMA, as disclosed in U.S. Pat. No. 5,172,278, also assigned to the same assignee as the present application. Buckminsterfullerenes are carbon-only cages (or carbonaceous hollow cage molecules), so named because of their resemblance to geodesic shapes described by Buckminster Fuller.

A need remains for a simple process for fabricating an optical limiter having a graded distribution of a reverse saturable material. Such a process would utilize the advantages of the prior art teachings while avoiding most, if not all, their disadvantages.

DISCLOSURE OF INVENTION

In accordance with the invention, an improved process is provided for making optical limiters having a graded distribution of a reverse saturable absorber compound in a host matrix. The process of the invention comprises:

(a) dissolving the reverse saturable absorber and the host matrix in a suitable solvent to form a solution having a pre-selected ratio of reverse saturable absorber to host matrix;

(b) casting the solution onto a surface to form a film;

(c) evaporating the solvent to form a free-standing film;

(d) performing steps (a)–(c) for each different desired ratio of reverse saturable absorber to host matrix;

(e) stacking the free-standing films in a desired order; and (f) hot-pressing the stack to form the optical limiter having a graded distribution of the reverse saturable absorber in the host matrix.

If desired, the stack of films can be placed in a die for hot-pressing. The films can be pre-cut to the shape of the die.

The process of the invention is convenient to employ, is relatively low cost, and is scalable to commercial production.

BEST MODES FOR CARRYING OUT THE INVENTION

In accordance with the present invention, an improved process is provided for the production of a solid optical limiter containing a graded distribution of the optical limiting compound, or reverse saturable absorber (RSA), in the solid matrix. The distribution of the compound, the thickness of the sample, the number of layers and thickness of each layer, the compound itself, and the nature of the solid host matrix can all be optimized to give an improved optical limiter as compared to the state of the art. More importantly, the present invention describes a process for making the limiter which is amenable to inexpensive production of the optical limiters on a large scale. Finally, the invention provides a specific RSA molecule, $C_{60}$ (Buckminsterfullerene), for use in the fabrication of optical limiters having a graded distribution. To the inventors' knowledge, this is the first description of a graded distribution of $C_{60}$ in a solid matrix.

The essence of the present invention is a process for making the solid optical limiter by use of thin film technology, followed by high temperature, high pressure molding process (compression molding). The process of the present invention has been used to make a number of solid samples of optical limiters comprising a graded distribution of reverse saturable absorbers in a solid matrix.

The reverse saturable absorber is selected from among the various buckminsterfullerenes and their derivatives, which have been disclosed in the above-referenced U.S. Pat. No. 5,172,278. Among the preferred buckminsterfullerenes are $C_{60}$ and $C_{70}$ and mixtures thereof.

Other reverse saturable absorbers may be selected from among the organometallics and their derivatives. Examples include chloroaluminum phthalocyanine (CAP) and its derivatives, silicon naphthocyanine, cyclopentadienyl iron carbonyl tetramer ("King's Complex"), and iron tricobalt decacarbonyl bistrimethylphosphine and derivatives thereof. Examples of additional reverse saturable absorbers may be found in related U.S. Pat. Nos. 5,172,278 and 5,080,469.

The host matrix comprises an optically clear polymer, such as the acrylates and methylacrylates, including polymethyl methacrylate (PMMA), as well as polycarbonate, polystyrene, and the like.

FIGS. 1–6 depict the sequence of the process steps of the present invention. First, a solution of the reverse saturable absorber and the host matrix in a suitable solvent is prepared. The solvent must be one that dissolves both the RSA and the host matrix. For example, in the case of a RSA comprising $C_{60}$ in a host matrix of PMMA, benzene is a suitable solvent. In the case of a RSA comprising CAP and PMMA, a mixed solvent system, comprising ethanol and tetrahydrofuran, is employed, since there is no single common solvent for the two species.

Figure 1:
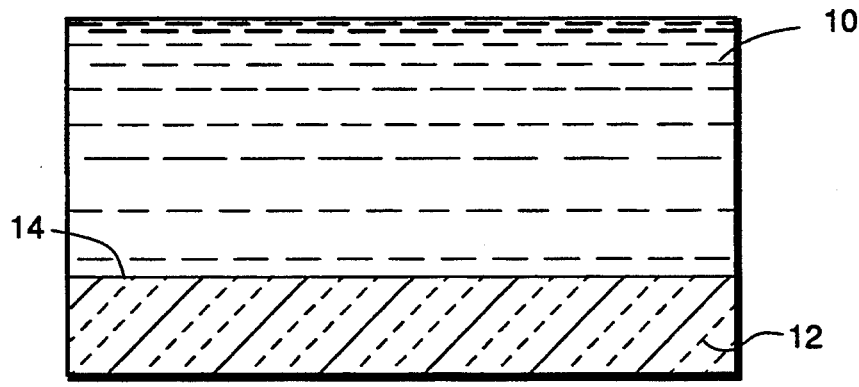
FIGS. 1–6 depict the sequence of steps in the process of the invention; all Figures are in cross-section, except for FIGS. 4 and 5, which are in perspective.

A given ratio of RSA to host matrix is prepared in the solvent, and the solution is then cast onto a smooth surface to form a film. FIG. 1 depicts solution 10 as cast onto a substrate 12 having smooth surface 14. The substrate may be chosen from any material that would provide a smooth surface to which the host matrix and RSA do not adhere. A suitable example is polytetrafluoroethylene, available under the tradename Teflon. Other examples of such substrate materials include polypropylene and glass.

Figure 2:
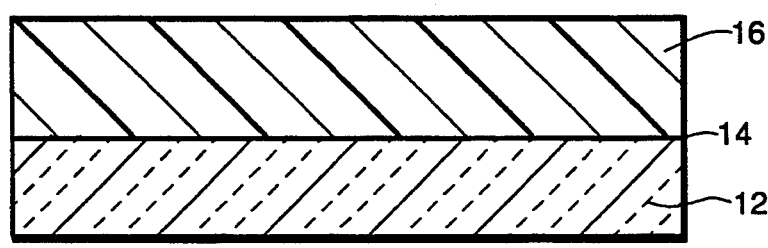
Figure 3:
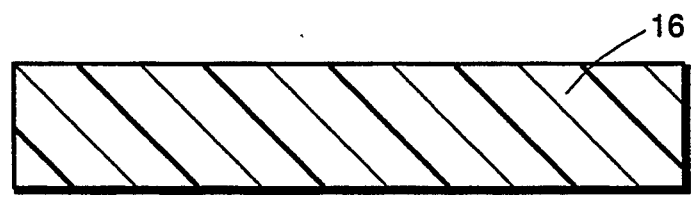

The solvent is evaporated, leaving a film 16, as shown in FIG. 2. Since the substrate has been preselected so that the film 16 is non-adherent thereto, the film 16 is easily removed to form a free-standing film, as shown in FIG. 3. The free-standing film be comprises a composite of the host matrix and the RSA, with the ratio of RSA to host matrix as initially selected. The thickness of the film 16 ranges from about 2 to 10 mils (0.051 to 0.254 mm).

Figure 4:
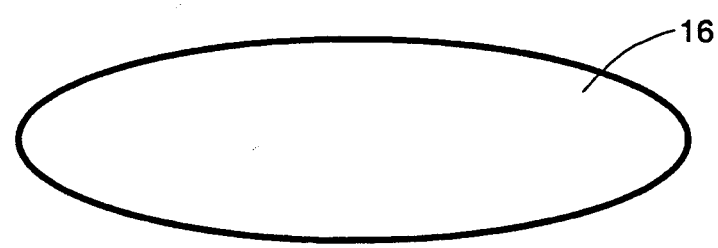

In preparation for placing into a die (not shown) for hot pressing, the free-standing film 16 may be cut into a circular, or other suitable shape, to fit the die mold. The resulting circular disk is depicted in FIG. 4.

A plurality of such disks 16 is prepared, each of a different concentration, or ratio of RSA to host matrix. The manner of preparing the different concentrations is immaterial, and may comprise preparing separate concentrations of RSA and host matrix in solution or, starting from a mother solution, successively diluting the solution with a solution comprising the host matrix in the solvent or solvent blend.

Figure 5:
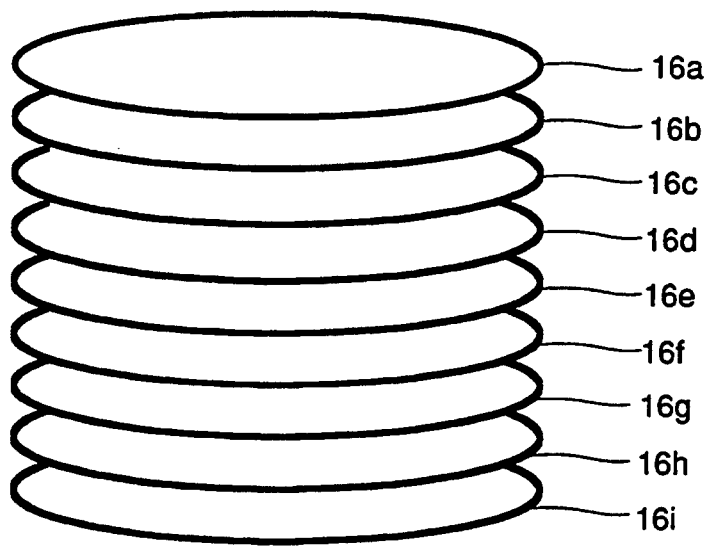

The plurality of disks, shown in FIG. 5 as comprising disks 16a to 16i, is stacked in a desired sequence of RSA concentration to provide a final graded distribution of the RSA in the host matrix. The exact required distribution can be optimized with respect to the total concentration, thickness, and the f-number of the lens used to focus the incident beam into the RSA material. As a rule of thumb, the concentration of molecules should follow the intensity of a weak optical beam, as it is focussed into the material. By weak is meant herein that the intensity of the focussed beam is sufficiently small that the added absorption due to RSA is small.

Clear disks 16' of the pure host matrix, with no RSA, are placed on both sides of the stack prior to hot-pressing. The clear disks 16' are thus placed to move the matrix interface away from the focus of the device. The disks are clear matrix, with no RSA, to best reduce surface damage at the interface.

Figure 6:
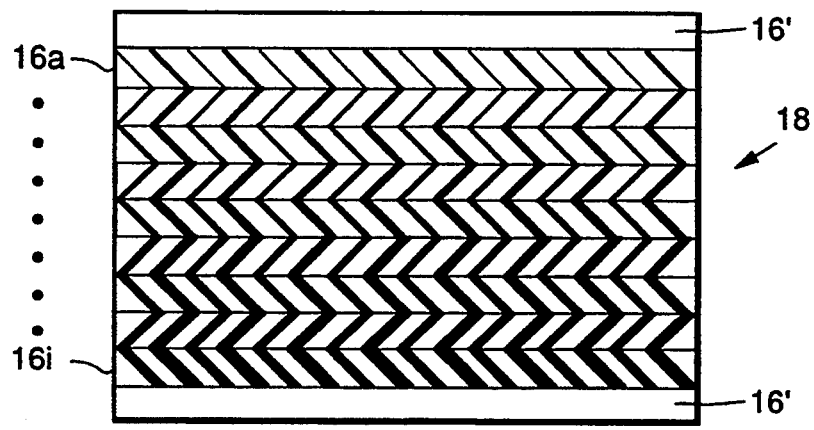

Finally, the stack is hot pressed under temperature and pressure conditions for a time sufficient to fuse the individual layers 16a to 16i together. The resulting optical limiter 18 is shown in FIG. 6. The RSA concentration changes along the optic axis 20 that the light enters and leaves the device 18.

The temperature, pressure, and time of hot pressing depend on the particular combination of RSA and host matrix selected. The selection of process conditions depends on the particular physical properties of the host matrix and any temperature instabilities of the host matrix or the RSA. As an example, in the case of a reverse saturable absorber comprising $C_{60}$ and a host matrix of PMMA, the temperature range is 90° to 250° C., the pressure ranges from about 30,000 to 100 psi (2,109 to 70.3 kg/cm$^2$), the higher pressures being associated with the lower temperatures, and the time of hot pressing ranges from about 10 to 120 minutes. Where the host matrix is LEXAN (a bisphenol A polycarbonate), the range of temperatures and pressures is about 300° to 500° F. (148.9° to 260° C.) and 50,000 to 5,000 psi (3,500 to 350 kg/cm$^2$).

Figure 7:
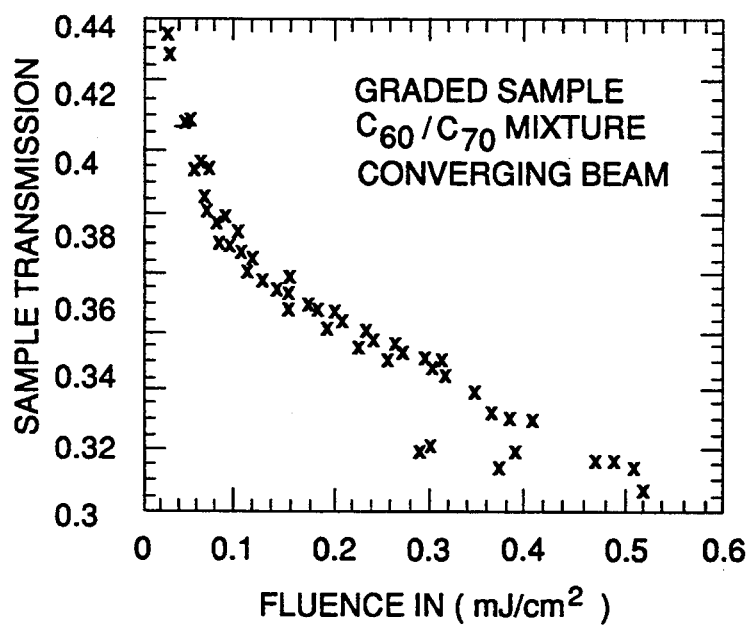
FIG. 7, on coordinates of sample transmission and fluence (in $mJ/cm^2$), is a plot of the transmission of a sample of the present invention with a graded distribution of a mixture of $C_{60}$ and $C_{70}$ in PMMA as a function of input fluence.

FIG. 7 depicts the transmission of a sample with a graded distribution of a mixture of $C_{60}$ and $C_{70}$ in PMMA, made by the technique described above, as a function of input fluence. The optical pulses are at a wavelength of 532 nm and have a temporal duration of 8 nanoseconds (full width at half maximum). The optical beam is focussed into the most concentrated layer of the sample. The decrease in sample transmission with incident intensity is a demonstration of reverse saturable absorption—the essential property required for optical limiters of the type described above.

EXAMPLES

Example 1

This example describes the incorporation of the RSA molecule Buckminsterfullerene ($C_{60}$) into the solid matrix polymethyl methacrylate (PMMA). The $C_{60}$ was placed into the PMMA with a graded distribution of the $C_{60}$ in the axial direction. Optical limiters of a graded configuration have improved limiting and damage characteristics as described in the related U.S. Pat. No. 5,080,469.

$C_{60}$ (10 mg) was dissolved in benzene (30 ml) by warming. PMMA (4.0 g) was added to the magenta solution and the mixture was stirred overnight to dissolve all components. The solvent was selected for compatibility of the RSA molecule and solid host matrix. The solution was filtered with pressure through a 0.40 $\mu$m filter to remove any particulates. The solution was concentrated on a rotary evaporator to 10 ml. A portion of the solution was laid out into a 15 mil (0.381 mm) thick film on a Teflon sheet. The solvent was evaporated in a clean nitrogen purged environment to give a 5 mil (0.127 mm) thick film of PMMA containing $C_{60}$ in a concentration of 2.5 mg/g PMMA. The remainder of benzene-$C_{60}$-PMMA solution was diluted with the proper amount of filtered benzene-PMMA solution to give a concentration of $C_{60}$ in PMMA of 1.3 mg/g. Again, a portion of the solution was laid out into a 15 mil (0.381 mm) thick film on a Teflon sheet, the benzene was evaporated, and the film was removed from the Teflon sheet. The process was repeated to give PMMA sheets, each having a thickness of about 5 mils (0.127 mm), containing $C_{60}$ in a concentration of 2.5, 1.3, 0.9, 0.6, 0.28, 0.20, and 0.05 mg $C_{60}$ per gram PMMA. The films were stamped into discs by using a stamp designed for that process. Residual solvent was removed in vacuum.

The discs were assembled in a room temperature molding die. The diameter of the die was slightly larger than the diameter of the discs. A number of clear PMMA discs (50 mil, or 1.27 mm, total thickness) were placed in the die followed by 5 mil (0.127 mm) thick discs of 2.5, 1.3, 0.9, 0.6, and 0.28, mg $C_{60}$ per gram PMMA. Then three 5 mil (0.127 mm) thick and sixteen 5 mil (0.127 mm) thick discs of 0.20 and 0.05 mg $C_{60}$ per gram PMMA were placed in the die. This gave an eight layer discrete approximation to the model calculation graded distribution described in the related U.S. Pat. No. 5,080,469.

All of the discs were wiped carefully with a lint free cloth using ethanol to remove any particulate contaminants. The process can be completed in a clean room to further remove any particulates from the sample. The plunger was placed in the die and the die was placed between two heatable platens of a press. The die was compressed to about 600 psi (42.2 kg/cm$^2$) pressure, and the platens were heated to a temperature of 170° C. At this temperature, there was a slow pressure drop between the platens, indicating some platen movement and therefore flow of the composite part in the die. The heating took about 45 to 60 minutes. The pressure was stabilized at 600 psi (42.2 kg/cm$^2$) and the platens and die were cooled by circulating cold water through the platens. After the die/platens cooled to room temperature (1 to 3 hours), the pressure was removed, and the die was disassembled. The composite part was removed from the die and the two surfaces were polished to give the active portion of the completed optical limiter.

The active portion thus formed had excellent optical quality and contained the RSA molecule $C_{60}$ in a axially graded distribution in the solid matrix.

It should also be noted that this Example describes the laboratory production of a single limiter. In practice, large scale coloration of the host matrix can be employed using hot rolls, in Banbury mixers, or while the solid host is in the liquid or pasty state. Alteratively, large amounts of uniform colored solid host may be made in solution followed by precipitation of the solid and drying. Large quantities of sheets of this colored solid can be made using standard thin film processing techniques (for example, extrusion). The resulting films can be stamped and compression molded into the active part of the optical limiter on a large scale in an automated process.

This Example 1 specifically describes the process to include the RSA molecule $C_{60}$ in an eight layer discrete axially graded distribution in PMMA. Large scale coloring and thin film technology can be used to contain more than eight layers in an approximation better representing the calculated graded distribution in the related U.S. Pat. No. 5,080,469.

Example 2

This Example describes the incorporation of the RSA molecule chloroaluminumphthalocyanine (CAP) into the solid matrix polymethyl methacrylate (PMMA). On both sides of the solid element of CAP were placed elements of PMMA with zero concentration of CAP. This was done to enhance the laser surface damage characteristics of the device. In addition, great care was taken to eliminate all scattering centers (usually particle contaminants) in the device to enhance the laser damage threshold in the solid matrix.

CAP (20 mg) was dissolved in ethanol (2 ml) by warming. The dark blue solution was added to a PMMA solution in tetrahydrofuran (THF) (8.0 g PMMA in 40 ml of THF). The solvents were selected for compatibility of the RSA molecule and solid host matrix. In this Example, the PMMA and CAP were not soluble in a common solvent, therefore a mixed solvent system was required. After stirring ten minutes, the blue solution was filtered with pressure through a 0.40 $\mu$m filter to remove any particulates. The solution was concentrated on a rotary evaporator to 20 ml. This gave the solution the proper viscosity to be laid out into a thin film. The solution was laid out into a 15 mil (0.381 mm) thick film on a Teflon sheet. The solvent was evaporated in a clean nitrogen purged environment to give a 5 mil (0.127 mm) thick film of PMMA containing CAP in a concentration of 2.5 mg CAP in each gram PMMA. The film was removed from the Teflon sheet and small discs of the film were made by using a stamp designed for that process. Residual solvent was removed in vacuum.

PMMA discs not containing CAP were made in a like manner without adding the RSA solution. Ten of the PMMA discs (50 mil, or 1.27 mm, total thickness) were placed into the room temperature molding die, in essentially the same manner as in Example 1. A number of PMMA discs containing the CAP (50 mil, or 1.27 mm, total thickness) were placed in the die followed by another 50 mil (1.27 mm) of PMMA discs.

The composite part was compression molded in an identical manner as in Example 1.

A composite comprising a plurality of different doped disks and compression molded as above exhibits excellent optical quality and contains the CAP molecule in an axially graded distribution in the solid matrix.

It should be noted that CAP, PMMA, the solvents ethanol and THF, the molding pressures and polishing, are exemplary only. Different solid matrices and RSA molecules may be used to give different optical limiters. In such cases, the solvents and molding conditions can and may have to be changed to provide a high quality optical limiter.

As discussed for Example 1, this describes the laboratory scale production of a solid optical limiter. The disclosed technique lends itself to a large scale automated production of low cost solid graded distribution optical limiters.

Example 3

This example describes the incorporation of the RSA molecule Buckminsterfullerene ($C_{60}$) into the solid matrix LEXAN, a bisphenol A polycarbonate, available from General Electric Co. The $C_{60}$ was placed into the LEXAN with a graded distribution of the $C_{60}$ in the axial direction.

Solutions of LEXAN in methylene chloride were made and then $C_{60}$ was added in the appropriate concentration using ethanol as a co-solvent. The parts were made by laying out a 10 mil (0.254 mm) film of 20% LEXAN (wt/vol in methylene chloride) onto a Teflon plate in a dry nitrogen purged environment. The sheets were later dried at high vacuum at 80° C. Attempts to use thicker cross-section films or higher concentrations of LEXAN gave cloudy films which did not press up into clear disks. About 50 mil (1.27 mm) sections of the doped LEXAN were placed between disks of two 50 mil (1.27 mm) sections of clear LEXAN. The approximate concentration of dopant in the samples was 1.3 mg $C_{60}$ per gram of LEXAN. The cut 2 mil (0.051 mm) thick disks were stacked in a pre-heated 350° F. (176.7° C.) die and pressed on a 600° F. (315.6° C.) at 500 psi (35.2 kg/cm$^2$) for 25 minutes.

A composite comprising a plurality of different doped disks and compression molded as above exhibits excellent optical quality and contains the $C_{60}$ molecule in an axially graded distribution in the solid matrix.

Example 4

This example describes the incorporation of the RSA molecule chloroaluminum phthalocyanine (CAP) into the solid matrix LEXAN. The CAP was placed into the LEXAN with a graded distribution of the CAP in the axial direction.

Solutions of LEXAN in methylene chloride were made and then CAP was added in the appropriate concentration using benzene as a co-solvent. The parts were made as in Example 2. The approximate concentration of dopant in the samples was 1.44 mg CAP per gram of LEXAN. The cut 2 mil (0.051 mm) thick disks were stacked in a pre-heated die and pressed as in Example 2.

A composite comprising a plurality of different doped disks and compression molded as above exhibits excellent optical quality and contains the CAP molecule in an axially graded distribution in the solid matrix.

INDUSTRIAL APPLICABILITY

The process of the invention is expected to find use in the fabrication of optical limiters employed in protection of the human eye by insertion into direct view optics such as periscopes and binoculars, as well as goggles and visors. The use of a solid host eliminates toxic solvents, and ensures that the final device is compact, rugged, and light weight. Other applications are in the fabrication of optical limiters for focal plane arrays used for electrooptic sensing, sensitive low threshold vision sensor and tracking devices, and other related products.

Thus, there has been disclosed a process for fabricating an optical limiter having a graded axial distribution of a reverse saturable absorber in a host matrix. It will be appreciated by those skilled in the art that various modifications and changes of an obvious nature may be made without departing from the scope of the invention, and all such modifications and changes are intended to fall within the scope of the invention, as defined by the appended claims.

What is claimed is:

1. A process for fabricating an optical limiter comprising a body having an optical axis therethrough and containing a graded distribution of a reverse saturable absorber in a host matrix, said graded distribution lying along said optical axis, the process comprising;

(a) dissolving said reverse saturable absorber and said host matrix in a suitable solvent to form a solution having a pre-selected ratio of reverse saturable absorber to host matrix;

(b) casting said solution onto a surface to form a film;

(c) evaporating said solvent to form a free-standing film having a thickness of about 0.051 to 0.254 millimeters;

(d) performing steps (a)–(c) for each different desired ratio of reverse saturable absorber to host matrix;

(e) stacking said free-standing films in a desired order; and (f) hot-pressing said stack to form said optical limiter.

2. The process of claim 1 wherein said stack is placed in a die having a given cross-section for said hot pressing and, prior to stacking said free-standing films in said desired order, each said film is cut to a shape corresponding to said cross-section.

3. The process of claim 1 wherein said reverse saturable absorber material is selected from the group consisting of buckminsterfullerenes, derivatives thereof, organometallics, and derivatives thereof.

4. The process of claim 3 wherein said buckminsterfullerene is selected from the group consisting of $C_{60}$ and $C_{70}$.

5. The process of claim 3 wherein said organometallic consists essentially of a material selected from the group consisting of chloroaluminumphthalocyanine, silicon naphthocyanine, cyclopentadienyl iron carbonyl tetramer, and iron tricobalt decacarbonyl bistrimethylphosphine and derivatives thereof.

6. The process of claim 1 wherein said host matrix comprises a substantially transparent material selected from the group consisting of polyacrylates, polymethacrylates, polycarbonates, and polystyrene.

7. The process of claim 6 wherein said host material consists essentially of polymethyl methacrylate and said hot pressing is performed at a temperature ranging from about 90° to 250° C. and at a pressure ranging from about 30,000 to 100 psi (2.109 to 70.3 kg/cm$^2$), the higher pressures associated with the lower temperatures, for a period of time ranging from about 10 to 120 minutes.

8. The process of claim 7 wherein said temperature is about 170° C., said pressure is about 600 psi (42.2 kg/cm$^2$), and said period of time ranges from about 45 to 60 minutes.

9. The process of claim 6 wherein said host material consists essentially of bis phenol A polycarbonate and said hot pressing is performed at a temperature ranging from about 300° to 500° F. (148.9° to 260° C.) and a pressure ranging from about 50,000 to 5,000 psi (3,500 to 350 kg/cm$^2$), the higher pressures associated with the lower temperatures.

10. The process of claim 1 wherein disks comprising no reverse saturable absorber are prepared and are stacked on either side of said stack in step (e) so as to minimize surface damage to disks containing said reverse saturable absorber.

11. A process for fabricating an optical limiter comprising a body having an optical axis therethrough and containing a graded distribution of a reverse saturable absorber in a host matrix, said graded distribution lying along said optical axis, the process comprising:
  (a) dissolving a reverse saturable absorber consisting essentially of at least one buckminsterfullerene selected from the group consisting of C$_{60}$ and C$_{70}$ and a host matrix selected from the group consisting of polymethyl methacrylate and polycarbonate in a suitable solvent to form a solution having a pre-selected ratio of reverse saturable absorber to host matrix;
  (b) casting said solution onto a surface to form a film;
  (c) evaporating said solvent to form a free-standing film;
  (d) performing steps (a)–(c) for each different desired ratio of reverse saturable absorber to host matrix;
  (e) forming disks of each said free-standing film;
  (f) stacking said disks of said free-standing films in a desired order; and
  (g) hot-pressing said stack to form said optical limiter at a temperature ranging from about 90° to 250° C. and at a pressure ranging from about 30,000 to 100 psi (2.109 to 70.3 kg/cm$^2$), the higher pressures associated with the lower temperatures, for a period of time ranging from about 10 to 120 minutes.

12. The process of claim 11 wherein said temperature is about 170° C. said pressure is about 600 psi (42.2 kg/cm$^2$), and said period of time ranges from about 45 to 60 minutes.

13. The process of claim 11 wherein said surface comprises polytetrafluoroethylene.

14. The process of claim 11 wherein said solvent comprises benzene.

15. The process of claim 11 wherein disks comprising no reverse saturable absorber are prepared and are stacked on either side of said stack in step (f) so as to minimize surface damage to disks containing said reverse saturable absorber.

* * * * *